July 20, 1965 D. E. WRIGHT 3,196,271
AIR DENSITY SENSITIVE GAUGES FOR SPACE CRAFT
Filed May 2, 1960 2 Sheets-Sheet 1

INVENTOR.
DONALD E. WRIGHT
BY
Reynolds, Beach & Christensen
ATTORNEYS

July 20, 1965  D. E. WRIGHT  3,196,271
AIR DENSITY SENSITIVE GAUGES FOR SPACE CRAFT
Filed May 2, 1960  2 Sheets-Sheet 2

INVENTOR.
DONALD E. WRIGHT
BY
Reynolds, Beach & Christensen
ATTORNEYS

United States Patent Office 3,196,271
Patented July 20, 1965

3,196,271
AIR DENSITY SENSITIVE GAUGES FOR SPACE CRAFT
Donald E. Wright, Seattle, Wash., assignor to Boeing Airplane Company, Seattle, Wash., a corporation of Delaware
Filed May 2, 1960, Ser. No. 26,339
7 Claims. (Cl. 250—83.3)

This invention relates to improved gauging devices capable of measuring ambient atmospheric density from a moving space craft, including airplanes, missiles, etc., and generally any other form of vehicle operating in the atmosphere, and further relates to a new and useful family of instruments based thereon, including but not necessarily confined to altimetric devices and Mach number indicators. The invention is herein illustratively described by reference to the presently preferred embodiments thereof; however, it will be recognized that certain modifications and changes therein with respect ot details and mode of operation are possible within the scope of the invention.

The present invention originated in efforts to provide more accurate and reliable altimetric devices capable of operation in high-performance space craft at high altitudes. In the past different techniques have been proposed for determining altitude from different ambient atmospheric conditions. Pressure, temperature and density represent the three parameters which may be used for this purpose. Inasmuch as pressure and density are more stable than temperature, they have received more consideration and are generally more satisfactory as an index of altitude. However, the choice between pressure and density as an altitude reference depends upon the facility and accuracy with which the parameter may be measured.

With pressure-type altimeters, the requirement of conducting air to the sensing device from outside the vehicle, using static and dynamic pressure ports, creates extensive calibration problems and is subject to complex and uncontrollable variations. The specific design of the aircraft and of the location and form of the pressure ports, flight, speed, angle of attack, etc., all have a direct effect on the readings. Also, at high altitudes (i.e., above the vicinity of 25,000 feet) horizontal pressure gradients in the atmosphere are relatively great, whereas instrumental inaccuracies also become more pronounced.

Density altimeters have appeared more promising for high altitude operation from the standpoint of meteorological considerations and basic factors influencing instrument accuracy. However, prior types of density gauges, such as the ionization chamber, i.e., alphatron, which could determine density altitude by ionizing a sample of air conducted to a special chamber from a port in the aircraft, are also subject to instrumental inaccuracies. As in the case of pressure-type gauges, density gauges which operate on the sampling principle, requiring sampling ports and ducts, are all subject to calibrational problems due to the effects of changes of air speed, angle of attack and temperature gradients along the sampling duct pasages.

In accordance with this invention static-port error factors are avoided by measuring density of the free air mass outside the vehicle, nearly independently of disturbances created by the vehicle and without necessity of sampling air by conducting it from a port to a sensing device. Thus, the variable factors mentioned above do not limit measurement accuracy.

A further object of the invention is to provide a density measuring device, and more particularly a density altimeter which functions with increasing accuracy at higher and higher altitudes, and which, significantly, is most effective in the range of altitudes above that in which conventional pressure altimeters are most effective. At altitudes below 15,000 feet, pressure of the atmosphere is representative of true altitude, perhaps more so than density. In the range between about 15,000 feet and 25,000 feet, pressure and density are alternatively acceptable as altitude references, with little to choose between them. However, above about 25,000 feet density is by far the more reliable source of altitude information, and while it may or may not represent absolute altitude, this is unnecessary because the principal problem at these high altitudes, wherein terrain clearance is not a factor, is to insure altitude separation of aircraft. An object of this invention, therefore, is a combination altimetric system using pressure altimetry at relatively low altitudes and density altimetry at higher altitudes.

A related object is to provide a reliable method and technique for effective utilization of combined pressure and density altimeters, so that, in the case of airplanes, for example, all pilots at any given altitude will be using the same altitude reference. In this regard, a unique feature of the technique is utilization of the upper isopycnic layer (i.e., about 25,000 feet) as a reliable reference point for changing over from pressure altitude measurements to density altitude measurements on increase of altitude, and vice versa on decrease of altitude. Inasmuch as this layer always occurs at substantially the same altitude, and remains substantially constant as to pressure (by reference to the value for the so-called "standard" atmosphere) from season to season and in different parts of the world, it constitutes a reliable basis upon which, either through instrumental operation or through pilot interpretation, airplanes may all be navigated as to altitude control on the same basis in order thereby to avoid collisions.

A further object of the invention is to provide a high-altitude altimeter which is highly accurate and reliable, simple to calibrate, and which is relative inexpensive and simple in its construction and consistent in its operation independently of flight conditions or aircraft design factors. A relative object is such a device which may be conveniently mounted on an aircraft or other space vehicle without interference with the operation of the vehicle.

A further object, relating to a further specific embodiment and application of the invention, is to provide a reliable and accurate Mach number indicator for high-performance space aircraft, which is highly accurate at high elevations as well as low elevations and which avoids inaccuracies and calibrational difficulties encountered with prior pressure and static port types of indicators, as a result of aircraft design, flight conditions, and port design and location.

In its presently preferred gauge embodiment for true ambient density measurement a radioactive source, preferably collimated, is mounted in the free stream and an associated detector is mounted in the free stream in position to receive subatomic particles, such as beta particles, emitted from the source into the free stream. The emitted beta particles collide with the orbital electrons and the nuclei of the air atoms, the number of collisions depending upon air density. In one embodiment the source directly faces the detector across an intervening layer of free-stream air, so that the arrangement is appropriately termed a "transmission" gauge. In this case "absorption" of beta particles, resulting from collisions with the air atoms, permits only a fractional portion of the originally emitted beta particles to reach the detector and be counted in the associated electronic impulse circuitry. The count rate is found to vary linearly in inverse proportion to density of the medium and is thus determinative of altitude. In a second embodiment both the source and the detector are mounted on or at the same supporting surface so as to face into the free-stream air region from generally the same aspect. In this case, some of the beta particles which collide with the air atoms and are deflected back thereby (i.e., are "back-scattered") are incident upon the detector and are counted. The rate of back-scattering (i.e., the count rate) is found to be linearly proportional to the density of the medium, and is thus also an indication of altitude.

While the invention is preferably practiced with the use of a radioactive source, it should be recognized that the same principles may be applied broadly by use of other forms of radiant energy which characteristically is measurably absorbed, deflected or reflected by the atmosphere variably as a function of density. For instance, ultraviolet radiation, to name but one other example, is strongly affected as to propagation characteristics by the presence of oxygen and nitrogen molecules. Moreover, in ultraviolet sources, it is readily possible to obtain high-intensity radiation without danger to personnel or equipment, whereas in the case of subatomic (i.e., radiosotope) radiation, low-level radioactive sources must be used for reasons of safety. The term "radiant energy," as the term is herein used, includes all forms of electromagnetic and subatomic particle radiation suitable to the purposes of the invention.

In applying the invention to measurement of Mach number, is desired the same gauging apparatus which measures density or density altitude may also conveniently be utilized as one element of the Mach number indicator, thus serving multiple duty. The Mach number indicator embodiment also includes a means to measure density of air in the stagnant region (i.e., between the boundary layer and the adjacent airfoil) and a means to derive the ratio of this measurement to that obtained by the free-stream air density measuring device. As herein disclosed, a back-scattering radiation type density gauge (viz., it could be a transmission type gauge) is used in measuring the stagnant air density so that the same consistently accurate basis of density measurement will be employed in measuring both elements of density from which Mach number is determined.

These and other features, objects and advantages of the invention will become more fully evident from the following description thereof by reference to the accompanying drawings.

Figure 1:
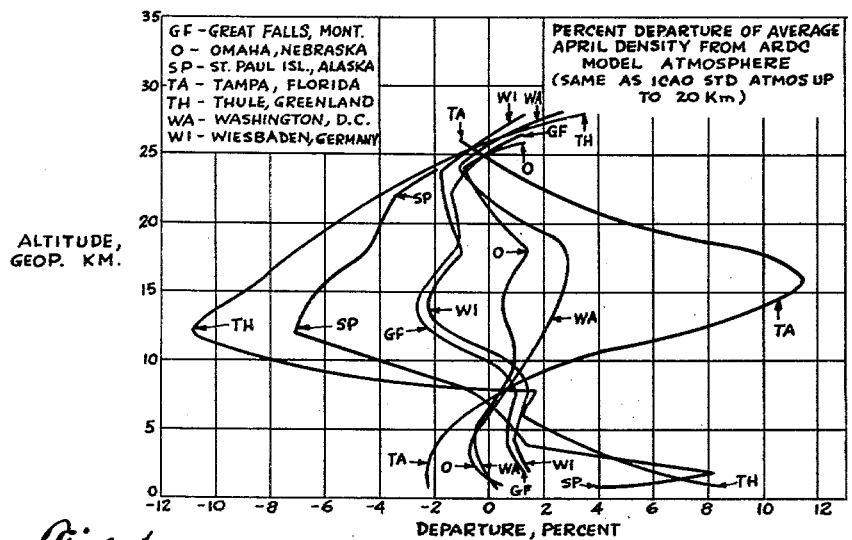
FIGURE 1 is a graph showing a typical set of curves representing departure of true atmospheric density from a standard value as a function of absolute altitude at a particular time of year, each curve representing departure at a particular geographic location.

The meteorological data graphically depicted in FIGURE 1 is taken from ASTIA Document No. AP 160755, Air Force Surveys in Geophysics No. 109 (Behavior of Atmospheric Density Profiles by Norman Sissenwine, William S. Ripley and Allen E. Cole, December 1958). As shown in this report and as demonstrated in FIGURE 1, there are two distinct altitude levels in the earth's atmosphere at which atmospheric density is substantially constant in different geographic locations. These constant-density or isopycnic layers occur at approximately 7,000 and 25,000 feet, respectively. Moreover, they occur substantially at the same altitudes in different seasons of the year, the graphs shown in FIGURE 1 representing data measurements made in April. Similar sets of data were obtained at other seasons of the year and verified the above observation, as disclosed in said report. Supporting data is disclosed in the reports by M. Doporto, Department of Industry and Commerce, in Meteorological Service, Geophysical Publications, volume III, No. 4, Dublin, Ireland, "The Computation of Atmospheric Pressure at Eight Kilometers Level of Constant Air Density, and in volume III, No. 6, "Dynamical Aspects of the Constancy of Air Density at Eight km." Monthly means densities at an altitude of approximately 25,000 feet (i.e., the upper isopycnic layer) do not differ from the standard density by more than one or two percent in any season of the year or geographic area, although departures from standard density at other levels vary as much as twenty percent.

In part the invention contemplates a novel method of space craft navigation as to altitude by which reliable terrain clearance and altitude separation is attainable in low-level flight and by which consistently reliable altitude separation between craft is assured in high-level flight. Moreover, as it is not safe for aircraft being flown on pressure-altitude information to occupy the same air space as aircraft being flown on density-altitude information, a conversion altitude must be defined below which all aircraft will be flown on pressure profiles and above which all aircraft will be flown on density profiles. In accordance with the presently disclosed system, conversion of altitude control basis occurs at the upper isopycnic layer, as measured by a reliable density altimetric apparatus such as that herein disclosed.

Figure 2:
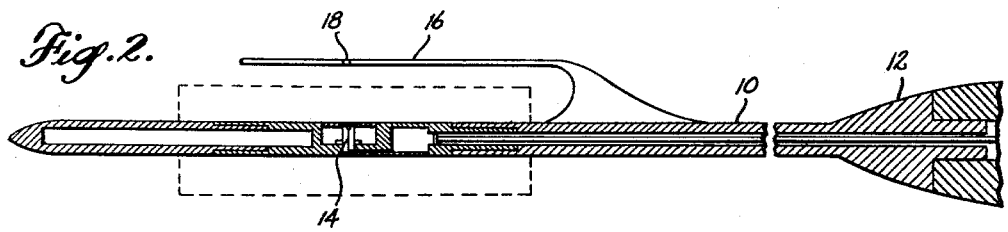
FIGURE 2 is a side view of a presently preferred probe configuration for mounting density measurement apparatus on a space craft or other vehicle.
Figure 3:
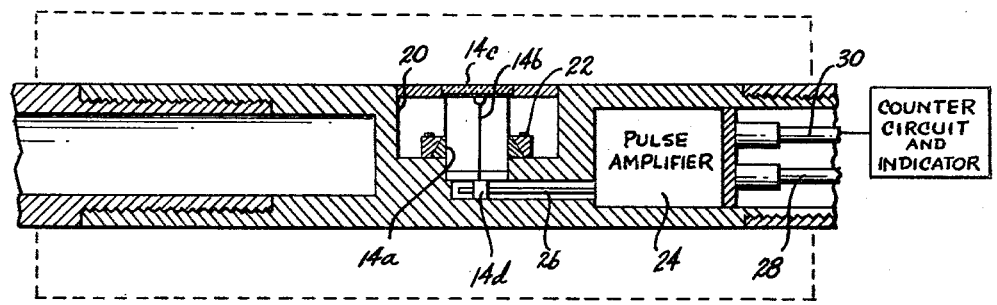
FIGURE 3 is a longitudinal sectional detail of that portion of the probe which carries the radiation detector and associated receiver.

In FIGURES 2 and 3, a forwardly projecting support probe 10 is mounted on the leading edge of a wing tip 12 or other airfoil, so as to project into the free air stream at a relative location on the spacecraft or other vehicle wherein the portion of the probe carrying the radiation detector 14 will be substantially uninfluenced by air disturbances created by movement of the vehicle. A secondary probe 16 mounted in parallel relation to the probe 10 and conveniently supported thereon carries a source of radiant energy 18, which in this embodiment comprises a collimated radioactive (beta-ray) source which is directed or faces toward the detector 14. The detector is aligned with the source 18 and faces toward it, both the source and the detector being directly exposed to and lying substantially in the undisturbed ambient free-stream air. Certain mechanical details of the probe are omitted for convenience of illustration and because they are of secondary importance. The detector in this case comprises a Geiger tube 14 which is mounted in a recess 20 in the side of the probe facing toward the source 18, and which tube includes a cathode shell 14a and a central electrode wire or rod 14b. A protective window 14c covers the exposed end of the tube. The detector window thickness should be less than 25 milligrams per square centimeter. Of course, in the case of a solid-state type of detector a window is not required. Another form of detector which may be used in conjunction with a radioactive source is, of course, the scintillator, which operates on the principle of photoactivation of a material by subatomic particle radiation from radioactive materials.

A securing flange assembly 22 holds the Geiger tube in the base of the socket recess 20. An anode terminal 14d provides a connection to a pre-amplifier 24 through the lead 26. The grounded cathode is connected to the ground side of the amplifier through the metal body of the probe. The Geiger counter tube and amplifier receive operating voltages through the multiconductor cable 28, whereas the amplifier output is conducted to the metering circuit apparatus through the output line 30.

In this embodiment the source 18 comprises a beta-emitting radioisotope such as carbon-14 or promethium- 147. Other radioactive sources producing subatomic particles are suitable for use in this apparatus, however, and within the limits of considerations previously set forth, the invention is not necessarily confined to any particular source material or any particular type of detector.

Considerations in the choice of radioisotope material for the radioactive source include low (safe) energy level, long half-life, stability of finished source (i.e., no danger of contamination), available in high specific activities, and low level of spurious radiation (i.e., Bremsstrahlung, etc.). The radioactive source should consist of nuclear electrons with a maximum energy greater than 0.1 million electron volts.

In this illustration, the subatomic particles (i.e., beta-rays) emitted from the radioactive source into the undisturbed ambient atmospheric air existing between the two portions of the probe are partially absorbed and partially deflected by collisions of theses particles with air atoms. Only a portion of the totally emitted particles are incident upon the detector. Those which impinge the detector are amplified in the pulse amplifier 24 and are counted in associated electronic counting circuit apparatus such as the detection metering circuit generally shown in block form in FIGURE 4. By thus metering the count rate air density is metered, and the readings or metered results may therefore be calibrated in terms of either density or altitude.

A primary advantage of placing the transmitting source 18 opposite the detector 14 so that the two face directly toward each other across an intervening body of air to be measured for density is that the density of the atmosphere decreases with a logarithmic relation to altitude, whereas the absorption of beta particles by the air decreases linearly with a logarithmic relation to density. Hence, a linear relationship exists between the transmission count rate and altitude, simplifying the meter calibration problem and providing a reliable basis for determining altitude.

Figure 5:
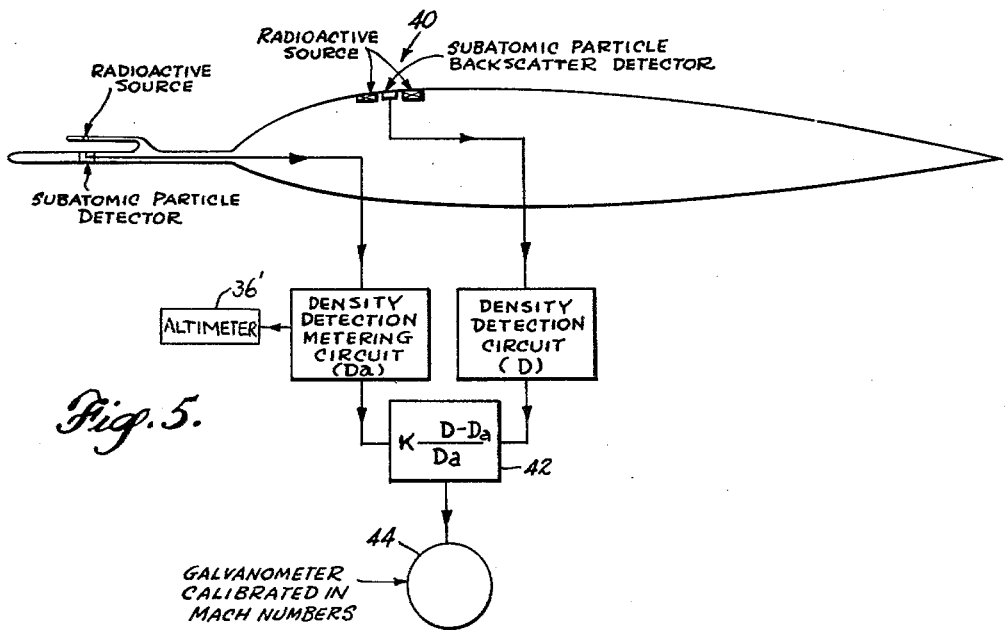
FIGURE 5 is a schematic diagram of Mach number measuring and indicating apparatus, also altitude metering apparatus combined therewith.

It will be evident, however (as shown in the Mach number system application of the invention depicted in FIGURE 5), that density may be measured by a back-scattering technique, wherein the detector and the source both face generally in the same direction from a supporting surface, and the radiant energy incident upon the detector is that which is deflected by more than a certain amount by collision with the air atoms. Since this form of device is shown as an element of FIGURE 5, later to be described, it will not be separately described and illustrated herein as a means by which to measure free-stream air density.

With the radioactive meansurement technique, it is possible to use a relatively weak source of energy and thereby to avoid danger to human beings in the vicinity of or occupying the aircraft, without necessity of special shielding requirements. Collimation of the source reduces exposure opportunities and improves the transmission-detection geometry so as to minimize edge effects. It is found that the amount of cosmic radiation and other background radiation at high elevations is not sufficient to influence the accuracy of the measurements nor, with Geiger tube type detectors, is there any adverse effect from ambient magnetic fields. With scintillator type detectors, however, using certain photo-multiplier tubes, magnetic shielding may be desirable.

Because the apparatus operates in the relatively undisturbed free stream and employs radiant energy which propagates at or near relativistic velocity, space craft design, angle of attack, flight velocity, and other variables which have a strong influence on the accuracy of pressure altimeters do not create undue calibration problems and related difficulties in the improved device. Because no sampling of air is required and no ports or sampling ducts are involved, instrument inaccuracies are much less with this system of altimetry than with the conventional pressure types, and with ionization chamber density types. Furthermore, inasmuch as density-measurement error is substantially proportional to the density being measured, it will be evident that measurement errors decrease progressively with increasing altitude. As a matter of fact, the density-altitude error (i.e., the accuracy of meterological correlation of ambient condition of the atmosphere with absolute altitude) decreases as the altitude increases. This latter relationship holds up to the point where cosmic and electronic noise factors become significant conditions which occur at extremely high altitudes.

It will be recognized that various known circuit techniques may be employed for measuring impulse rates and indicating such rates or utilizing the same to operate instruments or controls. The same holds true with respect to provision of circuit means to increase the signal-to-noise ratio of the gauging system, if desired.

Figure 4:
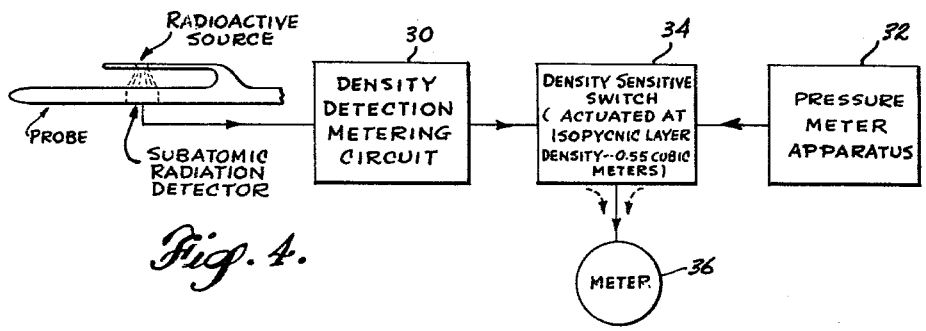
FIGURE 4 is a schematic diagram of a combined altimetric system employing both density and pressure measurement apparatus, in accordance with one aspect of the invention.

An instrument system for navigation as to altitude is illustrated in FIGURE 4, wherein automatic conversion of control basis takes place at the isopycnic layer. By having a similar system on every aircraft flying at altitudes ranging in excess of the isopycnic layer, and observing the regulations governing assignment of flight lanes and levels, reliable altitude separation of aircraft will be assured with minimum danger of collisions. As shown in this figure, the output from the detector apparatus is fed to a detection metering circuit 30 which is designed to measure the count level or rate of impulses reaching the detector from the radioactive source. In this example, the free-air density detector and source are arranged to operate on the transmission principle (i.e., absorption and deflection), but, of course, a back-scattering arrangement may alternatively be used. At altitudes below the isopycnic layer a conventional or other suitable pressure meter apparatus 32 operates through the density-sensitive switch 34 to actuate the altimeter indicator 36. However, when, during increase of altitude, atmospheric density reaches the value corresponding to the isopycnic layer density the density-senstitive or density-controlled switch, which is preferably controlled by or from the circuit 30, automatically operates to switch the meter 36 from the pressure meter apparatus 32 to the density detection metering circuit. The same transition takes place in reverse as density increases above that in the isopycnic layer. In this way, a single indicator instrument 36 is all that is necessary for the pilot to read, and he may be assured that all other pilots having similar apparatus are basing their altitude readings and flight programming on the same measurements.

In FIGURE 5 a specialized application of the invention is depicted wherein, in addition to density altitude, the speed of the space craft in terms of Mach number is measured and indicated. In this case, ambient atmospheric density and altitude is measured by the illustrated probe, source and detector arrangement feeding into the density detection metering circuit, which provides an electrical signal corresponding to the free-stream air density $Da$. If desired, an altitude indicator instrument 36' is operated by this signal. In addition, at a location on the space craft, such as near the leading edge of the fuselage, a wing, an engine nacelle or any other suitable location wherein stagnant air pressure along the surface remains fairly uniform over a substantial area, and bears a direct relation to boundary layer pressure, there is mounted a second density measuring device 40, which in this case is of the back-scatter type employing a weak radioactive source (preferably beta-ray) and a detector. Both the source and the detector are mounted at the surface and preferably flush therewith so that radiations emanating from the source do so in the stagnant air layer, which is within the boundary layer of the shock wave, and produce back-scattered energy which is incident upon the detector. Preferably the device 40 comprises a ring source holder surrounding a centrally located radiation detector. However, it will be recognized that transmission type gauges as well as other configurations and arrangements of back-scatter gauge sources and detectors, with the two in proximate relation to each other at the supporting airfoil surface, are also usable. One consideration in the choice of form and arrangement of the holder and source is the geometric consideration, i.e., the arrangement which produces the maximum incidence of back-scattered radiation upon the detector. These and other design details are or may be based on existing knoweldge, however, and are not necessary to an understanding of the system.

For Mach numbers materially above Mach 1, ultraviolet source gauges are considered to be more accurate for purposes of density gauging because of the difficulty of locating gauge elements out of regions of disturbed air and the lesser effect of disturbance on absorption or back-scattering of ultraviolet radiation.

Because with device 40 most of the subatomic particles from the weak source are back-scattered before they pass out of the stagnant air layer, the detector feeding the density detector circuit produces a count rate electrical signal D which is proportional selectively to density in the stagnant air layer. The signals $Da$ and $D$ are fed to a circuit apparatus 42 which is essentially a ratio-determining device capable of deriving an electrical signal proportional to the ratio of $D-Da/Da$. The output of this circuit 42 feeds a galvanometer 44 or other metering device calibrated in Mach numbers.

Present Mach number indication is obtained from Pitot and static pressure determination. The accuracy of these determinations is limited primarily by static pressure errors, aircraft design, angle of attack, etc., and these errors are overcome by the improved system based on density measurements without requirement for sampling of ambient air. As shown, the apparatus which measures density of the free stream ambient air may be the same as the apparatus which is used to measure atmospheric density for altitude determination and other purposes. Thus, a multiplicity of instruments may be operated by use of a single probe assembly.

These and other aspects of the invention will be recognized by those skilled in the art based on the above disclosure of the presently preferred practice thereof.

I claim as my invention:

1. Mach number measuring apparatus comprising, in combination with a space craft, means for measuring density of relatively undisturbed ambient air, including a radiant energy source, a radiant energy detector, means for mounting said source and said detector on said craft at relative locations proximate to each other substantially in the free stream and directed into such free stream, said detector being mounted and directed relative to said source to intercept a portion of the radiant energy emitted from the source and propagating through said free stream, and electrical means responsively connected to said detector and deriving an electrical signal related to the proportion of such radiation incident on said detector, means for measuring density of stagnant air inside the shock wave boundary layer produced by the craft, including a second radiant energy source, a second radiant energy detector, means for mounting said second source and said second detector on said craft at relative locations proximate to each other substantially in and directed into such stagnant air, said second detector being mounted and directed relative to said second source to intercept a portion of the radiant energy emitted from the second source and propagating through said stagnant air, and second electrical means responsively connected to said second detector and deriving a second electrical signal related to the proportion of such latter radiation incident on said second detector, and means responsively connected to said two electrical means and operable for producing an output proportional to the ratio of the two signals.

2. The combination defined in claim 1, wherein the two sources comprise subatomic particle sources and the second detector and source are mounted in a surface of the craft facing generally in the same direction, the second detector being thereby responsive to back-scattered particles radiating from the second source.

3. Mach number measuring apparatus comprising, in combination with a space craft, means for measuring density of relatively undisturbed ambient air, including a radioactive energy source, a radioactive energy detector, means for mounting said source and said detector on said craft at relative locations proximate to each other substantially in the free stream and directed into such free stream, said detector being mounted and directed relative to said source to intercept a portion of the radioactive energy emitted from the source and propagating through said free stream, and electrical means responsively connected to said detector and deriving an electrical signal related to the proportion of such radiation incident on said detector, second measuring means for measuring density of stagnant air inside the shock wave boundary layer produced by the craft, and second electrical means responsively connected to said second measuring means and deriving a second electrical signal related to the density measured thereby, and means responsively connected to said two electrical means and operable for producing an output proportional to the ratio of the two signals.

4. Combined instrumentation for space craft comprising, in combination with a space craft, means for measuring density of undisturbed ambient air, including a radioactive energy source, a radioactive energy detector, means for mounting said source and said detector on said craft at relative locations proximate to each other substantially in the free stream and directed into such free stream, said detector being mounted and directed relative to said source to intercept a portion of the radioactive energy emitted from the source and propagating through said free stream, electrical means responsively connected to said detector and deriving an electrical signal related to the proportion of such radiation incident on said detector, second measuring means for measuring density of stagnant air inside the shock wave boundary layer produced by the craft, second electrical means responsively connected to said second measuring means and deriving a second electrical signal related to the density measured thereby, and means responsively connected to said two electrical means and operable for producing an output proportional to the ratio of the two signals, galvanometer means responsively connected to the output of said last-mentioned means and calibrated in Mach numbers, and galvanometer means responsively connected to the output of the first-mentioned electrical means and calibrated in units of altitude.

5. Means for measuring free-stream air density from a moving vehicle comprising, in combination with a vehicle, a source of radiant energy, means on the vehicle mounting said energy source substantially in the free stream and directed into the free stream at a relative location substantially free of air disturbance by the vehicle, a radiation detector, means on the vehicle mounting said radiation detector substantially in the free stream and directed into the free stream at a relative location substantially free of air disturbance by the vehicle, the location of said detector being proximate to said source with said source and the detector both facing into the free stream in at least approximately the same direction so that radiation from the source back-scattered by the free-stream air is incident on the detector, and means responsively connected to said detector for measuring the proportion of radiation incident on said detector, and therefrom the air density.

6. Means for measuring free-stream air density from a moving vehicle comprising, in combination with a vehicle, a source of subatomic particles, means on the vehicle mounting said source substantially in the free stream and directed into the free stream at a relative location substantially free of air disturbance by the vehicle, a subatomic particle detector, means on the vehicle mounting said detector substantially in the free stream and directed into the free stream at a relative location substantially free of air disturbance by the vehicle, the location of said detector being proximate to said source, said source and said detector both facing into the free stream in at least approximately the same direction so that radiation from the source back-scattered by the free-stream air is incident on the detector, and means responsively connected to said detector for measuring the proportion of radiation incident on said detector, and therefrom the air density.

7. An altimetric system for space craft comprising, in combination: an atmospheric pressure sensing device operable at altitudes below about 25,000 feet; an atmospheric density sensing device operable at altitudes above about 25,000 feet comprising a source of subatomic particles, means for mounting said source on a space craft substantially in the free stream, and directed into the free stream at a relative location substantially free of air disturbances by the craft, a subatomic particle detector, means for mounting said detector substantially in the free stream and directed into the free stream at a relative location substantially free of air disturbance by the craft, the location of said detector being proximate to said source, and the directionality of said detector causing it to intercept a proportion of the radiation emitted into the free stream by said source, and means responsively connected to said detector for measuring the proportion of radiation incident on said detector, and therefrom the air density; and indicator means responsively connected to said devices and operable to indicate altitude therefrom, said indicator means comprising a single altitude indicator means and switching means connecting said single indicator means with said devices controlled by said density sensing device and operable to switch said indicator means from said pressure sensing device to said density sensing device in response to the level of density occurring at approximately 25,000 feet elevation (i.e., at the upper isopycnic layer) during increase of altitude, and to switch said indicator back to said pressure sensing device in response to such density during decrease of altitude.

References Cited by the Examiner
UNITED STATES PATENTS

| | | | |
|---|---|---|---|
| 2,166,104 | 7/39 | Collbohn | 73—384 X |
| 2,573,823 | 11/51 | Barghausen | 250—83.6 |
| 2,722,609 | 11/55 | Morgan | 250—83.6 |
| 2,744,697 | 5/56 | Van Allen | 250—83.6 |
| 2,790,324 | 4/57 | Babb | 73—384 |
| 2,797,385 | 6/57 | Miles | 324—33 |
| 2,908,819 | 10/59 | Marx | 250—43.5 |
| 2,922,888 | 1/60 | Faulkner | 250—83.6 |
| 2,951,159 | 8/60 | Mariner | 250—83.3 |
| 2,976,677 | 3/61 | Taylor | 250—43.5 |
| 3,018,376 | 1/62 | Vanderschmidt | 250—43.5 |
| 3,025,396 | 3/62 | Laughlin | 250—43.5 |

OTHER REFERENCES

Applied Radiation, Beta Backscatter Measures Altitude, Nucleonics, volume 18, No. 3, March 1960, page 124.

RALPH G. NILSON, *Primary Examiner.*

MILTON BUCHLER, *Examiner.*